(No Model.) 2 Sheets—Sheet 1.

F. F. KANNE.
JOINTED HARVESTER REEL.

No. 255,298. Patented Mar. 21, 1882.

WITNESSES:
W. W. Hollingsworth
W. Read

INVENTOR:
F. F. Kanne
BY
ATTORNEYS.

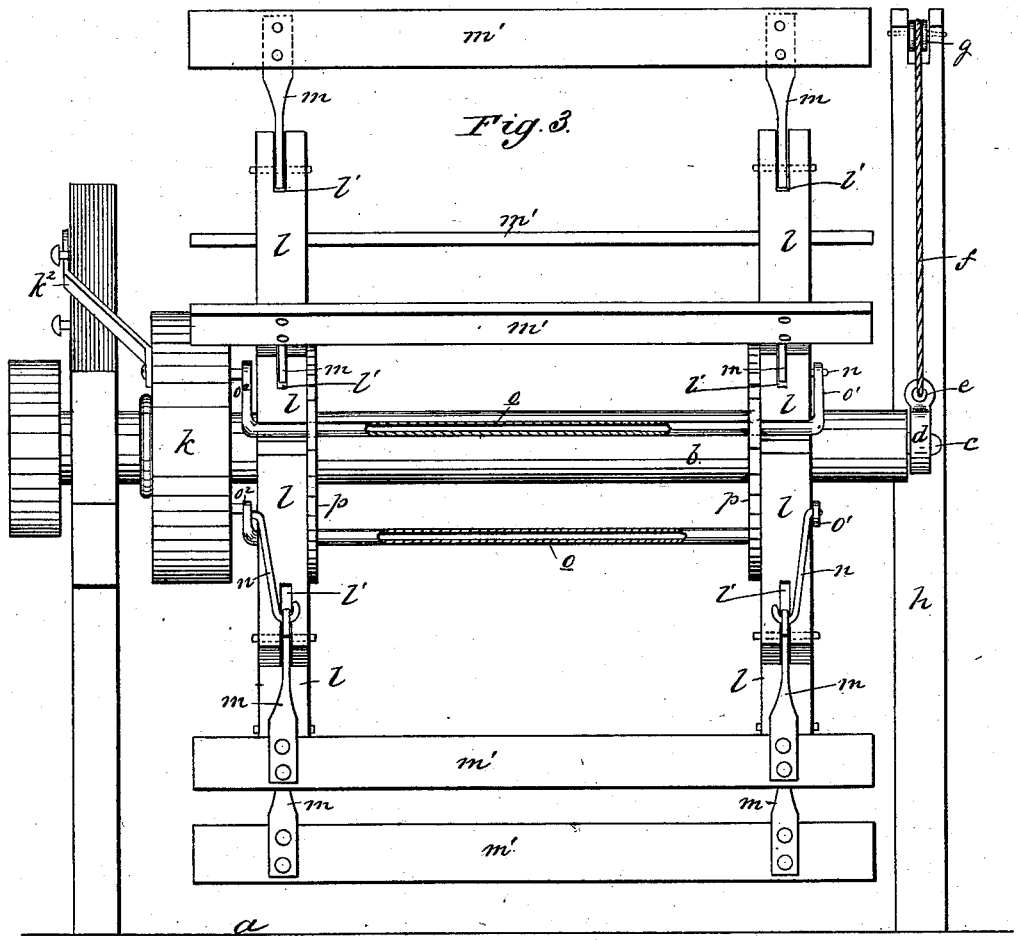

UNITED STATES PATENT OFFICE.

FREDERICK F. KANNE, OF WATERVILLE, MINNESOTA.

JOINTED HARVESTER-REEL.

SPECIFICATION forming part of Letters Patent No. 255,298, dated March 21, 1882.

Application filed January 12, 1882. (No model.)

*To all whom it may concern:*

Be it known that I, FREDERICK F. KANNE, of Waterville, in the county of Le Sueur and State of Minnesota, have invented a new and useful Improvement in Jointed Harvester-Reels; and I do hereby declare that the following is a full, clear, and exact description of the same, reference being had to the accompanying drawings, forming part of this specification, in which—

Figure 1:
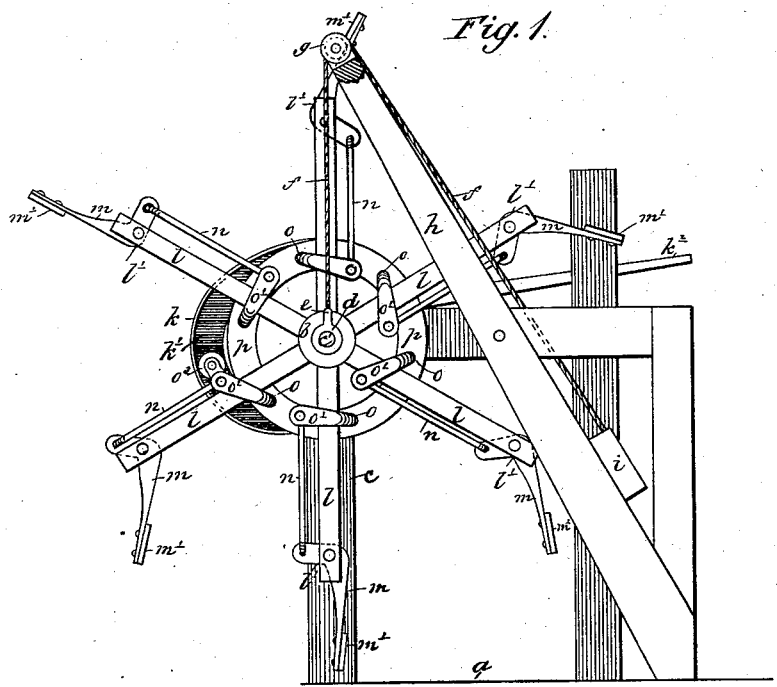
Figure 2:
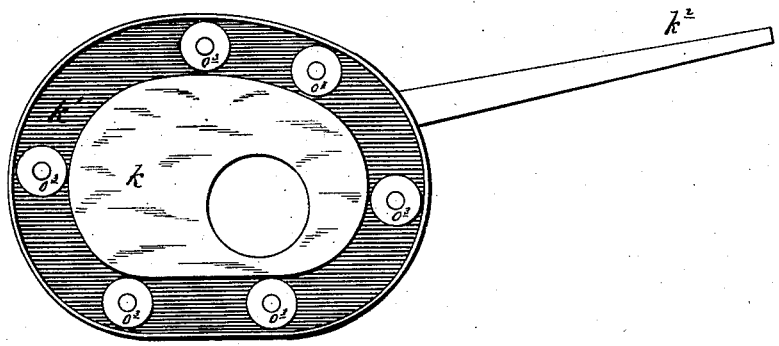

Figure 1 is an end elevation of my improved jointed harvester-reel. Fig. 2 is a face view of a cam and its operating-lever, and Fig. 3 is a side elevation.

My invention relates to improvements in jointed reels for harvesters; and it consists in the peculiar construction and arrangement of the parts, as hereinafter more fully set forth.

In the accompanying drawings, $a$ represents the platform of a harvester, provided at its front edge with fingers and cutters of any of the well-known constructions.

$b$ represents the horizontal shaft of a reel adapted to revolve over the platform and in front of the cutters in the usual manner. The horizontal shaft $b$ of the reel is journaled in the vertical reel-post $c$, secured at its lower end to the platform $a$, near its front edge, and near the side of the platform, on the driver's side thereof. The horizontal shaft $b$ of the reel is unsupported by a post on the grain side of the harvester, and is provided with a central gudgeon, $c'$, on its grain end, to which a metallic hook or box, $d$, is secured, the upper end of the hook being provided with an eye, $e$, to which a cord, $f$, is attached, the cord $f$ extending thence over a pulley, $g$, in the upper end of an inclined brace, $h$, attached to the platform $a$, and provided with a weight, $i$, at its rear end, whereby the end of the reel-shaft on the grain side of the harvester is supported, and the weight or strain on the box and reel-shaft on the driver's side of the machine is counterbalanced.

$k$ represents a cam on the reel-shaft on the driver's side of the machine, provided with a cam-groove, $k'$. The cam $k$ is provided with an eccentric hole for the passage of the reel-shaft $b$, and is also provided with a lever, $k^2$, secured to its closed face on the driver's side of the machine, whereby the driver in his seat, and while the machine is in motion, can, by raising or lowering the lever $k^2$, give more or less pitch to the cam and to the joints of the reel, owing to their adjustability, any of the ordinary devices for holding the lever $k^2$ when adjusted being employed.

$l$ represents the reel-arms, mortised into the reel-shaft $b$ at their inner ends in the usual manner, and each provided at its outer end with a slot, $l'$, in which opposite slots $l'$ are pivoted by pins the opposite bell-crank levers, $m$ $m$, the outer ends of each pair of bell-crank levers $m$ being secured to a slat or beater, $m'$, of the jointed reel, and the inner end of each bell-crank lever being secured by a hook, $n$, to the opposite crank-arms, $o'$ $o^2$, of a rock-shaft, $o$. The crank-arms $o'$ on the driver's side of the machine are provided with rollers $o^3$, adapted to revolve in the cam-groove $k'$ of the cam $k$. The rock-shafts $o$ are made of tubular iron, thereby securing great lightness and increasing the strength over the same amount of metal. $p$ $p$ represent flat rings secured to the inner faces of the reel-arms $l$ to strengthen the construction of the reel-arms. The rings $p$ are also provided with guide-holes for the passage of the tubular rock-shafts $o$. By this construction, in the revolution of the reel in the usual manner the slats or beaters will seize the uncut grain and lift it up on the canvas or platform, raising lodged grain. In windy days when the grain leans from the platform the reel will reach over the heads of the grain and move it back to the cutter-bar.

Another advantage of the construction of my jointed reel is that it will not force the grain over the platform, because the beaters tip and lift themselves out of the cut grain on the platform slowly and gradually.

What I claim as my invention is—

1. The combination, with the reel-shaft $b$, journaled in the reel-post $c$, and provided with the gudgeon $c'$ at its opposite end, and cam $k$, hung loosely on the reel-shaft on the driver's side of the machine, of the metallic hook $d$, having an eye, $e$, cord $f$, having a weight, $i$, at its rear end, and inclined brace $h$, provided with a pulley, $g$, at its upper end, substantially as described, and for the purpose set forth.

2. The combination, with the reel-shaft $b$, journaled in the reel-post $c$, and the cam $k$, hung loosely on the reel-shaft and provided with a cam-groove, $k'$, on the driver's side of the machine, of the slotted reel-arms $l$, rings $p$, bell-crank levers $m$, jointed beaters $m'$, hooks $n$, and rock-shafts $o$, having arms $o'$ $o^2$, the former provided with rollers $o^3$, operating in the cam-groove $k'$, substantially as described, and for the purpose set forth.

3. The combination, with the overhanging reel-shaft $b$, and cam $k$, hung loosely on said shaft and provided with the cam-groove $k'$, lever $k^2$, and means for holding the cam when adjusted, arranged on the driver's side of the machine, of the slotted reel-arms $l$, rings $p$, bell-crank levers $m$, jointed beaters $m'$, hooks $n$, rock-shafts $o$, having arms $o'$ $o^2$, and rollers $o^3$, substantially as described, and for the purpose set forth.

FREDERICK FRANK KANNE.

Witnesses:
M. R. EVERETT,
WM. GREENE.